Oct. 30, 1934.   S. TESZNER   1,978,969
DEVICE FOR PROTECTION OF ELECTRIC NETS AGAINST OVERVOLTAGES
Filed Jan. 15, 1931    3 Sheets-Sheet 3

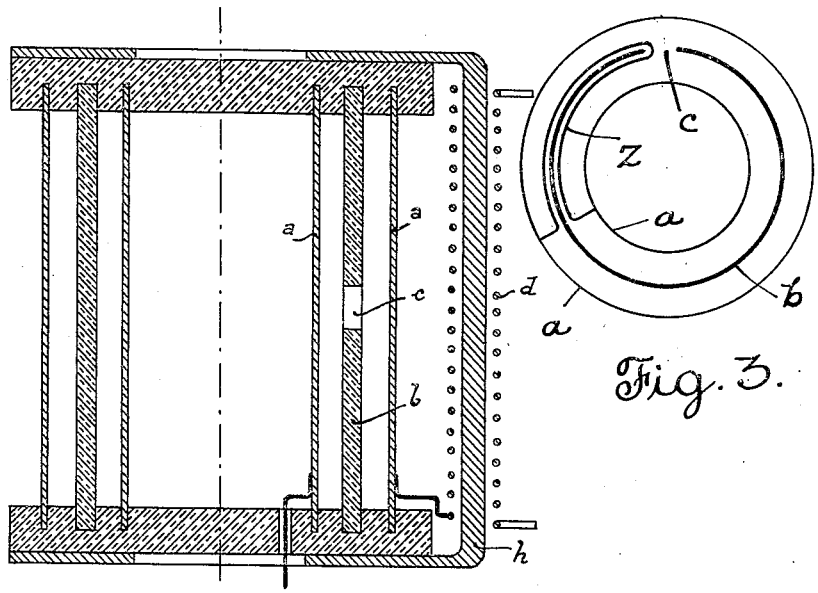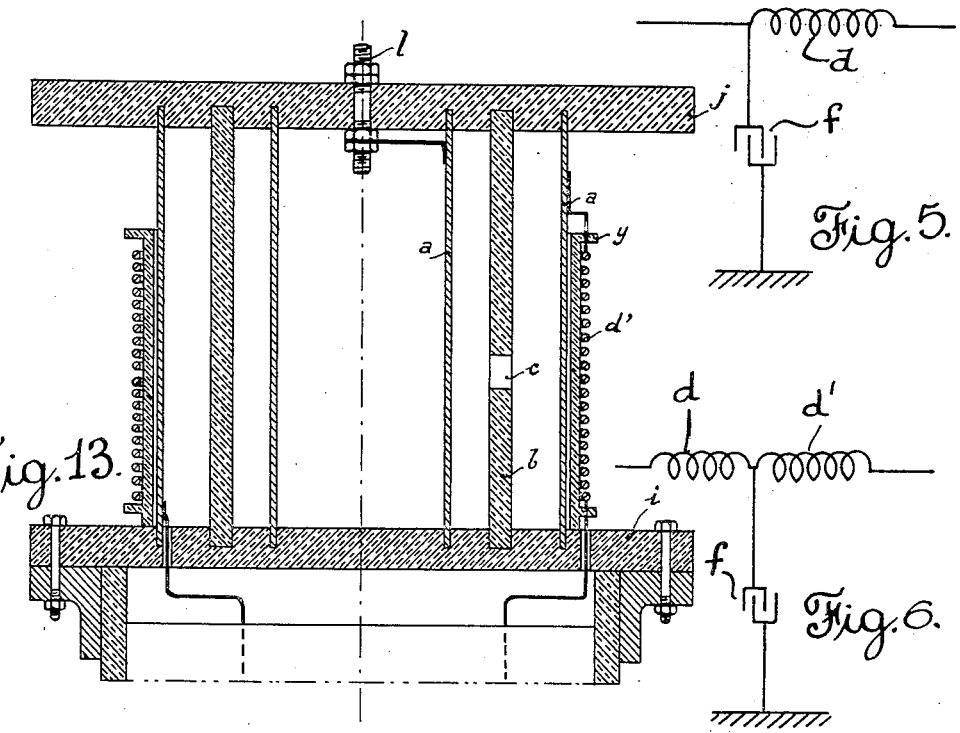

Inventor
Stanislas Teszner
by P Singer
Atty

Patented Oct. 30, 1934

1,978,969

UNITED STATES PATENT OFFICE 1,978,969

DEVICE FOR PROTECTION OF ELECTRIC NETS AGAINST OVERVOLTAGES

Stanislas Teszner, Grenoble, France

Application January 15, 1931, Serial No. 508,941
In France January 18, 1930

10 Claims. (Cl. 175—30)

The present invention relates to improvements of the device described in the French Patent Nr. 655,100 of Sept. 14, 1927 taken by Louis Barbillon and Stanislas Teszner.

The device described in the said patent consists in a protecting condenser and a lightning arrester forming an element thereof. The principle of the invention is to impart a suitable capacity to a certain number of air spark-gaps, in order to form elementary condensers in parallel relation and having a capacity sufficient for exercising an appreciable effect of slowing the steep fronts of the traveling waves. The value of 0,001 microfarad indicated in the said patent as the requisite value of the capacity necessary for the purpose aimed at, and easily obtainable fixes the ideas with regard to the capacities and to the number of the elementary spark-gap condensers.

In the patent of Messrs. Barbillon and Teszner a special embodiment is alluded to, which is that of even spark-gap condensers with uniform fields. This field ought to ensure an essential delay of starting of the arc; furthermore, it had to ensure, in combination with the great surface of the electrodes, an appreciable cooling of the arc, by an instantaneous increase of its right section owing to the discharge of the elementary condensers constituted by the plates.

In practical use however this method has revealed its insufficiency for ensuring a correct extinction of the arc or arcs started at the beginning of working of the apparatus acting as lightning arrester.

Furthermore, the manufacture of exactly flat or even plates encounter great difficulties. Finally, for obtaining a really efficient protection against the traveling waves with steep fronts (working as condenser) the apparatus must be accompanied by a choke coil reinforcing its action. The apparatus itself is not capable of affording an entire protection against overvoltages.

The present invention consists mainly in that the latter element: the choke coil, is included into the apparatus, in order to reinforce, on the one hand its action as condenser and to improve, on the other hand, its working as lightning arrester, and to ensure, mainly, by itself or in combination with other methods or means the extinction of the arc (or arcs) of discharge.

The invention consists equally in that the arcs are forced into apertures or recesses provided in the insulating pieces resisting to heat, and that they are extinguished, owing to their rapid displacement due to the effect of the magnetic field of the coil (or coils), along armatures constituting the electrodes, preventing the formation of craters, and to their lengthening owing to the insulating partitions arresting a part of the arc.

Another feature of the invention, which may be joined to the foregoing ones, consists in that the insulating partitions separate completely the armatures of opposite polarity, with exception of the spots of the openings destined for the passage therethrough of the arc. This arrangement increases the strength of the lines of force at the points coincident with the openings and prevents reformation of the arc in a shorter trajectory and hence prevents casual extinction of the arc.

The invention will be better understood in the course of the following description by reference to the appended drawings, in which Figs. 1 and 2 are respectively a vertical central section on the line 2—2 of Fig. 2 and a horizontal section on the line 1—1 of Fig. 1.

Fig. 3 is a diagrammatic representation of the arc at one moment of its displacement.

Fig. 4 is a section of a bobbin having a magnetic core.

Figs. 5, 6, 8, 9 and 10 are diagrams of fitting of the coil into the said apparatus.

Fig. 13 is an example of the embodiment of a simple lighting based on the principle of the invention, seen in elevation and in section.

Figure 1:
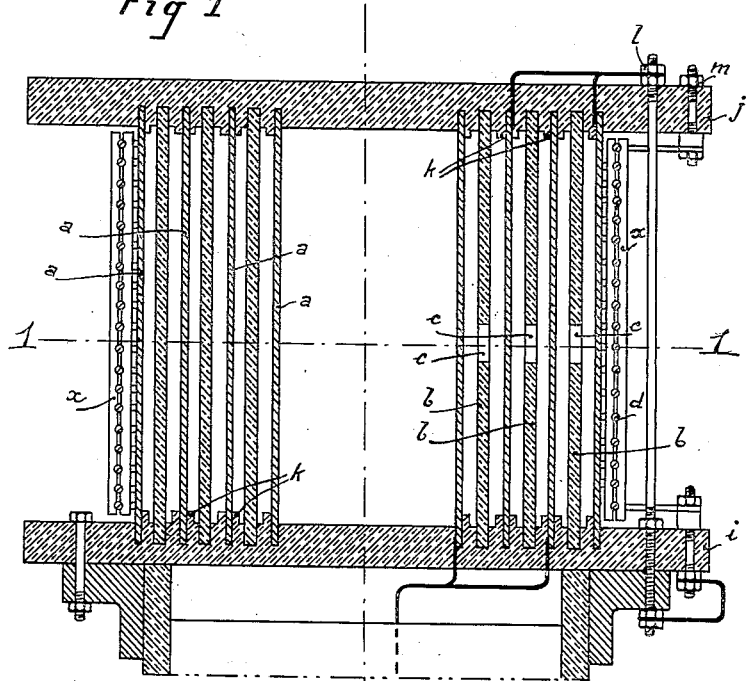
Figure 2:
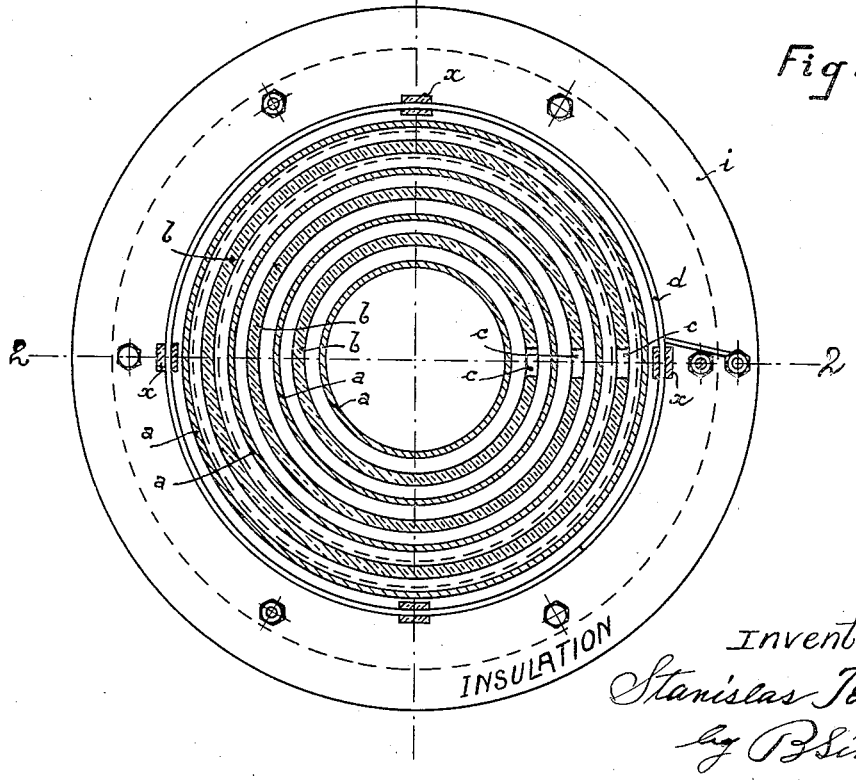

The invention comprises electrodes as armatures of tubular condensers arranged concentrically and in spaced relation (Figs. 1 and 2), and connected alternately to the line and to earth. The number of the concentric cylinders and their height are chosen in a manner ensuring to the apparatus an electro-static capacity sufficient for rendering this apparatus efficient as a condenser.

In each space between two electrode-armatures is placed one or several insulating tubes $b$ provided with one or several openings $c$ of any suitable shape and placed preferably midway between the ends, these openings localizing the spouting of the arc at their spots. For this purpose and in order to avoid contact between two extremities of the tubes or between one extremity of one tube and any point of the surface of another tube, the metallic and insulating tubes can be placed upon an insulating support $i$, provided with grooves receiving the extremities of the tubes, these tubes being covered by a cap $j$ also provided with such grooves. This arrangement has the advantage of affording a closed apparatus working nearly independently of all atmospheric conditions.

In order to increase the outline distance between the ends of the metallic tube constituting electrodes of opposite polarity, the support $i$ and the cap $j$ may be provided, in the space between the armatures, with insulating projections $k$ forming thin walls.

The coil $d$ mounted on the intermediary insulating pieces $x$, plays the role of the electromagnet exerting a blasting action and is placed concentrically to the tubes, either exteriorly or interiorly. The arrangement represented in the drawings (the exterior arrangement) seems to be preferable. The coil $d$ is connected to the post $m$ receiving one of the line wires, and also to the post $l$ from which the same line wire extends and which, furthermore, is connected to the armatures of the metallic electrodes $a$. The armatures $a$ placed below the coil are at the potential of the line and the coil $d$ is traversed by the current circulating in the wire.

The coil $d$ engenders an axial field, or a nearly axial field and causes a displacement of the arc in a plane perpendicular or nearly perpendicular to the axis of the tubes. Owing to the fact that one part of its length is arrested by the insulating partition, the arc $z$ assumes the shape indicated in Fig. 3 and lengthens itself more and more, until it becomes extinguished. On the other hand, a great portion of the arc applies itself toward the partition or partitions and is thereby cooled so that the conditions of its extinction are greatly improved and its extinction is hastened.

In said Fig. 3, which is diagrammatic, a single insulating partition $b$ is indicated by way of example as located between two armatures $a$, the arc in its elongated condition being indicated at $z$. It will be understood that the number of the armatures may be increased, and the same is true of the insulating partitions.

The metal tubes constituting the armatures can be provided with longitudinal slits so as not to engender dampening circuits. The inner tube may be solid in order to annihilate or to reduce the number of magnetic lines of force passing inwardly (for it follows a decreasing circuit opposed to the passage of the lines of force) and to increase in this way the intensity of the field in the useful space.

It will be understood that the coil could be also placed, either not co-axially with the electrodes or in any other manner, with or without a magnetic core completed eventually by polar pieces, engendering, in any case, a field in the space between the electrodes, of suitable intensity and direction. The polar pieces may, for example, be constituted as on Fig. 4 in the shape of discs $h$ placed above the cap and below the support,— which parts insulate the tubes,—so as to engender a nearly axial field in the space between the electrodes.

It is also obvious that the right or straight section of the electrodes and of the insulating partitions may be circular or rectangular, polygonal and so on, in fact the present invention permits of the most varied designs and arrangements in accordance with the principle or principles laid down in the preamble of this specification.

In case of arrangement of a single coil $d$ (Fig. 5) placed at one side only of the lightning arrester condenser $f$ its working as condenser will not be efficient to the utmost degree, either owing to the disposition of the coil $d$ with regard to the condenser, or owing to the distance between the protecting apparatus and the apparatus to be protected, or owing to any other reason. In such case the apparatus will be equipped with two coils $d$, $d'$ placed at both sides of them (Fig. 6).

Figure 7:
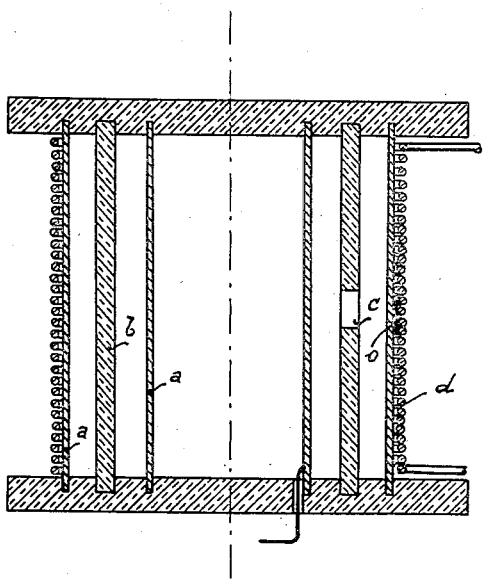
Fig. 7 is a section of two bobbins branching out from two sides of a lightning-condensers according to an embodiment of the invention.

It is, for example, possible to place both these coils outwardly so as to surround the uttermost armature-electrode of the apparatus as shown in Fig. 7, their common point $o$ being connected to this armature.

The armatures of the same polarity are either interconnected electrically or insulated from each other. They are connected at one part to the net and at the other part to earth through the medium of resistances or without them.

It is obvious that in the apparatus described above the rupture of the arc is the greater the more intense the blasting action. Now, in lines for a great intensity of the utilized current it is impossible to employ coils having a great number of turns, without increasing, frequently excessively, the costs of an apparatus. Besides, in the case of a lightning arresting condenser placed immediately at the terminals of a transformer or of a machine, where its best attachment point is situated, a single coil will be required for ensuring the highest acting efficiency as condenser, whereas two coils will be needed for ensuring in every case the blasting of the arc by the lightning arrester.

Hence it is obvious that in such case it might be preferable to have recourse to an electro-dynamic blasting exerted by a coil, different from the coils previously referred to, which is not traversed by the utilized current and which effects the blasting action, either alone or in combination with the coil or coils placed in series in the line, viz. in series with the spark gap.

Figure 8:
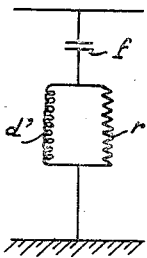

The disadvantage of such a fitting of the coil is that the passage of the traveling wave with a steep front is impeded, or in general, the passage of an over-tension of high frequency across the apparatus is hindered. In order to avoid this objection recourse is had to an arrangement consisting in that the coil is shunted to a resistance of a value relatively feeble with regard to that of the natural impedance of the coil. For this purpose use is made of a part or of the entire discharging resistance situated in series with the spark-gap of the lightning arrester, for example according to the diagrams of connection shown in Figs. 8, 9 and 10. In Fig. 8 the coil $d'$ is shunted to the entire resistance $r$; in Fig. 9 the coil $d'$ is placed in series with a supplementary resistance $S$, the whole being shunted to a part of the discharging resistance $r$ or to this entire resistance; finally, according to Fig. 10 the coil $d'$ is shunted to a part $r'$ only of the resistance $r$.

The working of the device is obvious. For high frequency phenomenons and for waves with a steep front the coil shunted by a feeble resistance does not play any role. For low frequency phenomenons the coil can enter into action, yet without diminishing in any manner whatsoever the protecting action of the apparatus. On the contrary, the coil will be traversed by nearly the whole utilized current (its resistance being much smaller than the shunted resistance), so that the blasting will be ensured as long as the arc of discharge persists.

Any suitable arrangement of this blasting coil on the apparatus can be resorted to, provided that the coil engenders in the explosive interval a magnetic field sufficient to displace the arc.

Preferably this coil is arranged concentrically to the electrodes, either exteriorly or interiorly or in another manner, and is equipped with a magnetic iron-circuit with polar pieces arranged in a suitable way.

Of course the constructive features of the apparatus of this kind may undergo the most manifold modifications. For example in the apparatus described insulating tubular partitions are referred to, having one or several apertures. Now, in case of the electrostatic capacities of the condenser being somewhat greater and the utilized tensions somewhat higher, the dimensions of certain tubes may engender difficulties of manufacture. In such case it is possible to replace the tubes complete by their segments only which may be eventually provided with holes, the working of the device being of course the same as above specified (Fig. 3).

Figure 11:
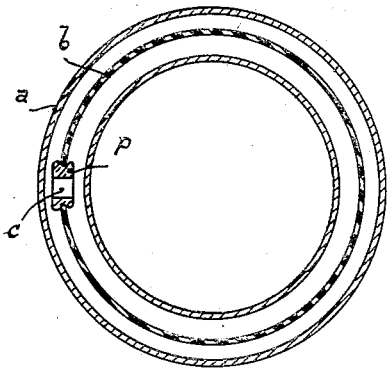
Fig. 11 is a section of a short circuit device of the insulating partition.

In some cases the thickness of the partition could constitute a drawback. For lightning arresters, for example, for a relatively low voltage to be employed, it may be advisable to reduce as much as possible the arc-starting voltage and consequently the air-gap between the electrodes; in this case, the interval corresponding to the thickness of the partition constitutes of course an impediment. In order to suppress the same it is possible to short-circuit this partition by a metal ring $p$ (Fig. 11) placed, for example, into the aperture of the partition $b$ between the electrodes $a$.

Figure 12:
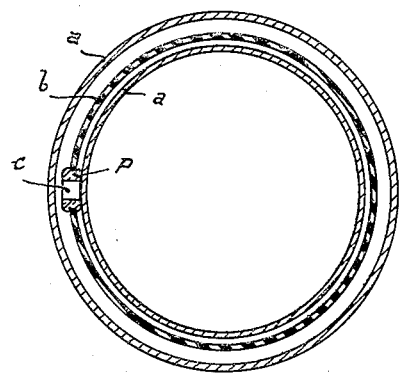
Fig. 12 is a similar view of a different arrangement of this partition.

According to Fig. 12 the partition is placed against one of the electrodes so that a single explosive gap remains.

Figure 9:
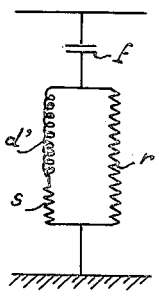
Figure 10:
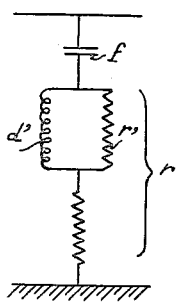

It must be added that in accordance with the principle laid down in the present invention it is possible to build a simple lightning arrester, viz. an apparatus destined to protect the net against over-tensions of great amplitude by unloading it. As in this case the conditions of a great electrostatic capacity are no more deciding, it will be possible, though it is not absolutely necessary, to reduce the number of electrodes to two and to diminish their surface. It is equally possible to limit oneself to a single coil and even to suppress it—since in such case the coil $d$ in series in the line does not influence appreciably the protecting action of the device—and to employ for the blasting of the discharging arc a coil shunted to the resistance $r'$—or to a part of the same—, placed in series with the explosive gap, for example according to one of the diagrams previously alluded to (Figs. 8 to 10).

In Fig. 13 the tubular electrodes $a$ are shown as separated by an insulating wall $b$ provided with an opening $c$ and the whole is maintained between an insulating socket $i$ and a cap $j$. The solenoid is wound on an insulating core $y$ and surrounds the outer electrode $a$.

The terminal $l$ is connected to the interior electrode and to the line. The solenoid is branched in parallel on a fraction of the resistance to the outer electrode; the latter is connected to the ground by the entirety of the resistance according to the diagram of Fig. 10.

What I claim, is:

1. A discharge lightning arrester comprising spaced tubular electrodes, one within the other, of opposite polarity and between which there is produced a discharge arc, a self-induction coil to create an axial magnetic field between the electrodes in the plane where the damping or absorption of the discharging arc occurs, so as to assure a rapid and circumflex movement of said arc, and a tubular insulating partition between and spaced from the electrodes constructed and arranged to arrest a part of the trajectory of the arc and to cause the elongation and cooling of the arc under the influence of the blast action due to the said magnetic field, said tubular insulating partition having an opening for the passage of the elongated arc therethrough.

2. A lightning arrester as claimed in claim 1, in which the electrodes are respectively connected to the line and to earth.

3. A lightning arrester as claimed in claim 1, including an insulating supporting member for the electrodes and partition and having grooves in which one end of each electrode and partition is arranged.

4. A lightning arrester as claimed in claim 1, including insulating members at the ends of the tubular electrodes and the tubular partition and having grooves in which said ends are arranged so that said tubular electrodes and insulating tubes are maintained in spaced relation.

5. A lightning arrester as claimed in claim 1, in which the insulating partition is tubular and has an opening for the passage of the elongated arc therethrough, and a ring of conducting material in said opening and projecting in opposite directions toward the electrodes to reduce the air gap therebetween.

6. A lightning arrester as claimed in claim 1, in which the insulating partition is tubular and has an opening for the passage of the elongated arc therethrough, and a ring of conducting material in said opening and projecting in opposite directions toward the electrodes to reduce the air gap therebetween, one of the projecting ends of said ring touching one of the electrodes to leave only a single air gap between one electrode and the insulating partition.

7. A discharge lightning arrester as claimed in claim 1, in which the self-induction coil it in series with the line to be protected.

8. Apparatus as claimed in claim 1, in which the coil is arranged in shunt between the line and earth and in series with the tubular electrodes.

9. A discharge lightning arrester as claimed in claim 1, in which the self-induction coil is in series with the line to be protected and one of the electrodes and the other electrode is grounded.

10. A discharge lightning arrester as claimed in claim 1, in which the self-inductor coil is in two parts connected in series with each other and with the line, and having a common terminal connected to one of the electrodes, and the other electrode is grounded.

STANISLAS TESZNER.